(12) United States Patent
Sanchez

(10) Patent No.: US 12,412,218 B2
(45) Date of Patent: Sep. 9, 2025

(54) SYSTEMS AND METHODS FOR DETERMINING PERSONALIZED LOSS VALUATIONS FOR A LOSS EVENT

(71) Applicant: QUANATA, LLC, San Francisco, CA (US)

(72) Inventor: Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

(21) Appl. No.: 17/930,831

(22) Filed: Sep. 9, 2022

(65) Prior Publication Data

US 2023/0005073 A1    Jan. 5, 2023

Related U.S. Application Data

(63) Continuation of application No. 16/883,421, filed on May 26, 2020, now Pat. No. 11,488,253.

(51) Int. Cl.
*G06Q 40/08* (2012.01)
(52) U.S. Cl.
CPC .................... *G06Q 40/08* (2013.01)
(58) Field of Classification Search
None
See application file for complete search history.

(56) References Cited

U.S. PATENT DOCUMENTS

| | | | |
|---|---|---|---|
| 7,107,239 | B2 | 9/2006 | Graff |
| 7,941,330 | B1 | 5/2011 | Buentello et al. |
| 8,041,636 | B1 | 10/2011 | Hunter et al. |
| 8,335,700 | B2 | 12/2012 | Zizzamia et al. |
| 8,543,430 | B1 | 9/2013 | Fields et al. |
| 9,836,792 | B2 | 12/2017 | Dixon |
| 9,836,793 | B2 | 12/2017 | Busque et al. |
| 10,176,532 | B1 | 1/2019 | Hanson et al. |
| 10,210,577 | B1 | 2/2019 | Davis et al. |
| 10,223,750 | B1 | 3/2019 | Loo et al. |
| 10,262,375 | B1 | 4/2019 | Howard |
| 10,300,373 | B2 | 5/2019 | Hickman et al. |
| 10,311,521 | B1 | 6/2019 | Capone et al. |
| 10,339,604 | B1 | 7/2019 | Cook |
| 10,593,109 | B1 * | 3/2020 | Floyd .................... G06T 17/05 |

(Continued)

*Primary Examiner* — Matthew S Gart
*Assistant Examiner* — Amit Patel
(74) *Attorney, Agent, or Firm* — BRYAN CAVE LEIGHTON PAISNER LLP

(57) ABSTRACT

A computer system for determining personalized loss event valuations is provided. The computer system includes one processor in communication with at least one memory device, and the at least one processor is programmed to: (i) receive user data from the user computer device, wherein the user data include data related to a user's personal information and personal property, (ii) utilize a trained machine learning model to determine a first loss valuation associated with a first loss event based at least in part upon the user data, (iii) utilize the trained machine learning model to determine a second loss valuation associated with a second loss event based at least in part upon the user data, wherein the first loss event and the second loss event are different loss events, and/or (iv) generate a loss event policy that includes the first loss valuation and the second loss valuation.

20 Claims, 7 Drawing Sheets

(56) References Cited

U.S. PATENT DOCUMENTS

| | | | |
|---|---|---|---|
| 10,977,734 B1 | 4/2021 | Kenney | |
| 2002/0062249 A1 | 5/2002 | Iannacci | |
| 2007/0118410 A1 | 5/2007 | Nadai | |
| 2010/0044430 A1 | 2/2010 | Song et al. | |
| 2011/0066454 A1 | 3/2011 | Rosauer et al. | |
| 2011/0161117 A1 | 6/2011 | Busque et al. | |
| 2011/0251917 A1 | 10/2011 | Etzioni et al. | |
| 2012/0253852 A1 | 10/2012 | Pourfallah et al. | |
| 2012/0323609 A1 | 12/2012 | Fini | |
| 2013/0262156 A1 | 10/2013 | Ketzef | |
| 2014/0081675 A1 | 3/2014 | Ives et al. | |
| 2014/0122134 A1 | 5/2014 | Fini | |
| 2014/0180725 A1 | 6/2014 | Ton-That et al. | |
| 2014/0278573 A1* | 9/2014 | Cook | G06F 16/245 705/4 |
| 2014/0279474 A1 | 9/2014 | Evans et al. | |
| 2015/0006206 A1 | 1/2015 | Mdeway | |
| 2015/0127430 A1 | 5/2015 | Hammer, III | |
| 2015/0178851 A1 | 6/2015 | Dutt et al. | |
| 2015/0206249 A1 | 7/2015 | Fini | |
| 2016/0035038 A1 | 2/2016 | Perkins | |
| 2016/0180468 A1 | 6/2016 | Buss et al. | |
| 2016/0232615 A1 | 8/2016 | Le | |
| 2017/0323319 A1 | 11/2017 | Rattner et al. | |
| 2019/0005586 A1 | 1/2019 | Lei et al. | |
| 2019/0080325 A1 | 3/2019 | Pourfallah et al. | |
| 2020/0302322 A1 | 9/2020 | Tukiainen et al. | |
| 2021/0090177 A1 | 3/2021 | Sears | |

\* cited by examiner

SYSTEMS AND METHODS FOR DETERMINING PERSONALIZED LOSS VALUATIONS FOR A LOSS EVENT

CROSS-REFERENCE TO RELATED APPLICATIONS

This application is a continuation of, and claims the benefit of U.S. patent application Ser. No. 16/883,421, filed May 26, 2020, the disclosure of which is hereby expressly incorporated by reference herein in its entirety.

FIELD OF THE DISCLOSURE

The present disclosure relates to determining flat-rate insurance payouts after loss-events, and more specifically, the network-based systems and methods for determining personalized loss valuations associated with loss events based at least in part upon the event and policyholder information.

BACKGROUND

Some insurance policies provide coverage for loss or damage to the personal possessions of a policyholder. After a loss event (e.g., an event during which some amount of personal property was lost, such as fire, flooding, or theft), a policyholder typically files an insurance claim seeking reimbursement for lost property, and the insurance company may issue a payout to the policyholder based at least in part upon incurred damages.

Historically, the insurance claim process is slow, laborious, and difficult to verify. In many cases, the policyholder may not have taken a thorough inventory of personal possessions prior to the loss event, thereby creating difficulties for the policyholder in specifying all of the items that may have been damaged during the loss event. Additionally, the insurance provider may be needed to verify the items and the claimed values in order to mitigate potentially inaccurate or fraudulent insurance claims. The process is labor-intensive and potentially expensive for both parties.

Accordingly, a system that simplifies and streamlines the insurance claim process is desired.

BRIEF SUMMARY

The present embodiment may relate to systems and methods for determining personalized loss valuations for a loss event and generating a loss event policy for a user.

In one aspect, a computer system for determining personalized loss event valuations is provided. The computer system includes one processor in communication with at least one memory device, and the at least one processor is programmed to: (i) receive user data from the user computer device, wherein the user data include data related to a user's personal information and personal property, (ii) utilize a trained machine learning model to determine a first loss valuation associated with a first loss event based at least in part upon the user data, (iii) utilize the trained machine learning model to determine a second loss valuation associated with a second loss event based at least in part upon the user data, wherein the first loss event and the second loss event are different loss events, and/or (iv) generate a loss event policy that includes the first loss valuation and the second loss valuation. The computer system may include additional, less, or alternate functionality, including that discussed elsewhere herein.

In another aspect, a computer-implemented method for determining personalized loss event valuations is provided. The method is implemented by a computer system including one processor, and the method includes: (i) receiving user data from the user computer device, wherein the user data include data related to a user's personal information and personal property, (ii) utilizing a trained machine learning model to determine a first loss valuation associated with a first loss event based at least in part upon the user data, (iii) utilizing the trained machine learning model to determine a second loss valuation associated with a second loss event based at least in part upon the user data, wherein the first loss event and the second loss event are different loss events, and/or (iv) generating a loss event policy that includes the first loss valuation and the second loss valuation. The computer implemented method may include additional, less, or alternate actions, including those discussed elsewhere herein.

In yet another aspect, at least one non-transitory computer-readable storage media having computer-executable instructions embodied thereon for determining personalized loss event valuations is provided. When executed by at least one processor, the computer-executable instructions cause the processor to: (i) receive user data from the user computer device, wherein the user data include data related to a user's personal information and personal property, (ii) utilize a trained machine learning model to determine a first loss valuation associated with a first loss event based at least in part upon the user data, (iii) utilize the trained machine learning model to determine a second loss valuation associated with a second loss event based at least in part upon the user data, wherein the first loss event and the second loss event are different loss events, and/or (iv) generate a loss event policy that includes the first loss valuation and the second loss valuation. The computer-executable instructions may provide additional, less, or alternate functionality, including that discussed elsewhere herein.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DRAWINGS

Figure 1:
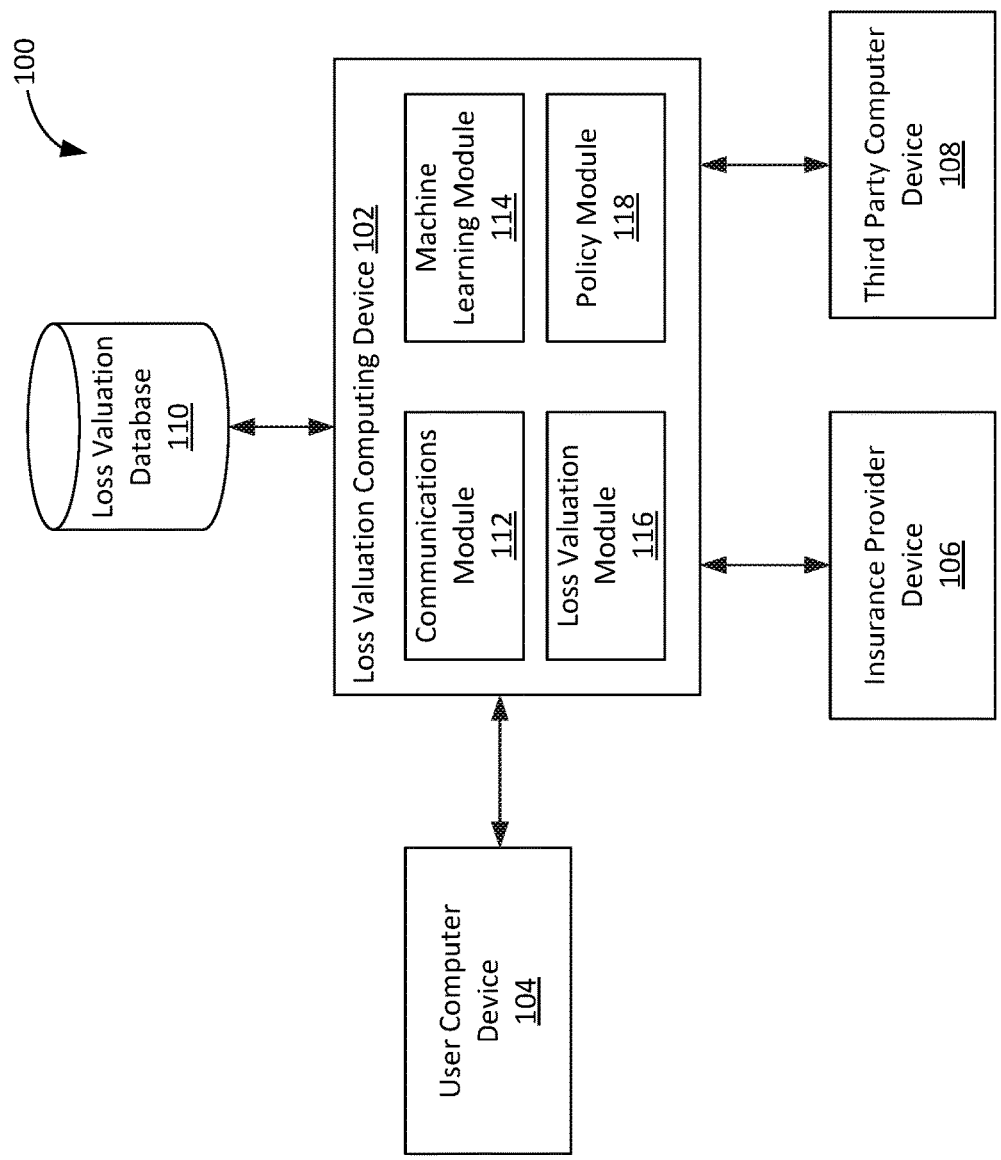
FIG. 1 illustrates a simplified block diagram of a loss valuation ("LV") computer system configured to determine personalized loss event valuations, according to various embodiments.

The present embodiments may relate to, among other things, systems and methods for determining personalized loss valuations for loss events. In particular, the systems and methods described herein include a loss valuation ("LV") computer system configured to utilize user data and personal property information to estimate loss valuations (e.g., monetary damages or costs) associated with various loss events for a particular user and generate a loss event policy based at least in part upon the loss valuations.

In one example embodiment, the LV computer system is used in an insurance-related process for generating flat-rate payouts for policyholders. In some insurance systems, payouts to policyholders after loss events may be based at least in part upon inventory and/or property lost by the user, wherein the lost inventory is determined based at least in part upon comparing a post-event inventory to a pre-event inventory. In some cases, the pre-event inventory is determined before the event, while in other cases, the pre-event inventory is determined retroactively. In the present embodiment, however, rather than generating payouts based at least in part upon inventory comparisons, the LV computer system may generate flat-rate payouts for loss events based at least in part upon user data and event information. For example, the LV computer system may be configured to generate a loss event policy detailing flat-rate payouts for different loss events. The loss event policy may include a list of loss events with associated flat-rate payouts, such as "Fire—$6,000", "Flood—$2,000", "Theft—$1,000", etc. In some embodiments, the insurance payout process is utilized for a renter's insurance policy. In alternative embodiments, the insurance payout process is utilized for any type of insurance policy or for non-insurance related processes.

In the exemplary embodiment, The LV computer system includes a loss valuation ("LV") computing device configured to receive user data (including personal and property information), analyze the data (e.g., using a trained machine learning model), and generate loss valuations for a plurality of potential loss events based at least in part upon the analysis. The LV computing device is further configured to generate a loss event policy based at least in part upon the loss valuations and generate revised loss valuations in light of additional received data.

In the exemplary embodiment, the LV computer system includes the LV computing device in communication with a user computer device, a third party computer device, an insurance provider computer device, and a loss valuation ("LV") database. The LV computing device is configured to receive user data from the user computer device and a valuation model from the LV database and generate loss valuations for a plurality of loss events based at least in part upon the user data. The LV computing device is further configured to generate a loss event policy based at least in part upon the loss valuations and transmit the loss event policy to at least one of the insurance provider device and the user computer device.

The LV computing device is further configured to receive event data and inventory data from the user computer device, along with third party event data from the third party computer device. The LV computing device is configured to analyze the event data and generate a specific event valuation based at least in part upon the specific event. The LV computing device is further configured to analyze the inventory data and third party event data and generate a revised valuation in light of the additional data. The LV computing device is configured to transmit the specific event valuation and the revised valuation to at least one of the insurance provider device and user computer device.

As used herein, "loss valuation" or "loss event valuation" may refer to monetary losses or costs associated with repairing, replacing, or otherwise handling damages to personal property or real-estate due to a loss event. "Flat-rate payouts" or "payouts" refer to monetary compensation provided to a user or an insurance policyholder after a loss event. In alternative embodiments, payouts are the same as loss valuations and/or based at least in part upon loss valuations. For example, the LV computing device may determine a loss event valuation and an insurance device may issue a payout equal to the loss event valuation. In another example, the LV computing device may determine a loss event valuation and an insurance device (or the LV computing device) may issue a payout based at least in part upon applying a formula to the loss event valuation.

As used herein, determining a single value or number may also, in alternative embodiments, include determining a range of values and/or a confidence level associated with the range of values.

Examples of Generating Loss Event Policies

In the exemplary embodiment, the LV computer system is configured to generate loss event policies based at least in part upon user data. Specifically, the LV computing device is configured to analyze user data and event-related data in order to determine loss valuations associated with various potential events. The LV computing device is further configured to generate a loss event policy based at least in part upon the loss valuations associated with specific loss events. For example, the LV computer system may receive user data including a value of a user's home, demographic information about the user, and security systems associated with the user's home. The LV computer system may generate estimated loss valuations for a number of potential loss events, such as theft, fire, flood, and earthquake, among others. In other words, based at least in part upon the user's specific information (e.g., value of home, user demographics, user behaviors, risk-mitigating systems in the user's home, etc.), the LV computer system generates personalized loss valuations for various loss events. For example, for a particular user's loss event policy, a fire loss event may be assigned a valuation of $6,000 and a break-in loss event may be assigned a valuation of $2,000.

In the exemplary embodiment, loss events may be any event that causes damage to a user's personal property or real-estate, or any event that causes some other kind of monetary or opportunity cost for a user. For example, loss events may include, but are not limited to, natural disasters (e.g., forest fire, flooding, earthquake, tornado, hurricane, blizzard, hail, sink holes, other weather events, etc.), systems failures (e.g., power surge, power outage, plumbing failure and house flooding, electrical fires, etc.), or human-caused damages (e.g., theft, vandalism, break-ins, arson, negligence, etc.).

In the exemplary embodiment, user data may include demographic information, personal information, digital information, housing information, real-estate information, personal property information, location information, pet-related information, medical information, or any other type of data/information that is related to a user and/or aspects of a user's real-estate and personal property.

In the exemplary embodiment, the LV computing device is configured to utilize a trained machine learning ("ML")

model to analyze user data and generate loss valuations and a loss event policy for a user. Specifically, the LV computing device is configured to receive user data from a user computer device and a trained ML model from a database. The LV computing device is configured to analyze the user data using the ML model and identify patterns, make predictions, determine potential outcomes, and determine various loss valuations for loss events based at least in part upon the user data.

In one embodiment, the LV computing device utilizes a ML model trained using supervised learning, such that the LV computing device is able to predict an output based at least in part upon specific types of inputs on which the ML model was trained. For example, the LV computing device may receive images of fire damage, analyze the images using image recognition techniques, and estimate total damage caused by the fire based at least in part upon the image analysis.

In another embodiment, the LV computing device utilizes a ML model trained using unsupervised learning, such that the LV computing device is able to identify patterns in unorganized data and predict outputs based at least in part upon various types of input data. For example, the LV computing device may receive demographic information including the location of a user's home, the age of the user, and the occupation of the user, and the LV computing device may determine a likely value of the user's home and a like value of the possessions owned by the user. Further, the LV computing device may determine the likely loss value caused by a break-in based at least in part upon the values of the user's home and the user's possessions.

In the exemplary embodiment, the LV computing device is configured to generate loss valuations for a number of loss events and compile the loss valuations to generate a loss event policy for the user. The loss event policy may include any number of loss events with associated loss valuations (e.g., payouts or flat-rate payments). In one embodiment, the LV computing device is configured to compile various loss valuations for a particular user into a single loss event policy. The LV computing device is configured to transmit the loss event policy or individual loss valuations to the user computer device or the insurance provider.

In alternative embodiments, the LV computing device 102 is configured to utilize additional data, such as event data, inventory data, and third party event data in generating loss valuations and loss event policies. Event data, inventory data, and third party event data are described in more detail below.

Examples of Generating Event-Specific Loss Valuations and Revised Valuations

In the exemplary embodiment, the LV computing device is configured to receive event data, inventory data, and third party event data and generate an event-specific loss valuation and/or a revised evaluation. In one embodiment, the LV computing device is configured to receive event data from the user computer device, where event data are any data describing, detailing, or reporting a loss event. For example, event data may include, but is not limited to, text, video, image, message, or form data received from the user computer device. In one embodiment, a user logs into an application or web-site that connects his/her user computer device to the LV computer system. The LV computing device may present the user with a number of options such as text forms, multiple choice selections, or other input options with which the user can describe and/or report a loss event.

In the exemplary embodiment, based at least in part upon the event data, the LV computing device is configured to determine a specific event valuation. In one embodiment, the LV computing device compares the reported event to the events detailed in the loss event policy and determines the specific event valuation based at least in part upon the loss event in the loss event policy that matches the event data. In another embodiment, the LV computing device analyzes the event data and determines which event in the loss event policy most closely resembles the described event. In another embodiment, the LV computing device analyzes the event data and determines an appropriate specific event valuation that doesn't match any particular loss event valuation described in the loss event policy. For example, the LV computing device may determine that an event in the loss policy matches the event data exactly. In another example, the LV computing device may determine that the event data indicates a loss event somewhere in between events described in the loss event policy and generate a specific event valuation based at least in part upon averaging certain valuations in the loss event policy.

In the exemplary embodiment, the LV computing device is further configured to receive inventory data and third party event data and determine a revised valuation based at least in part upon the received data. In the exemplary embodiment, the LV computing device is configured to receive inventory data detailing a user's inventory taken after a loss event. Based at least in part upon recovered inventory, the LV computing device is configured to determine if a revised valuation needs to be generated and, if so, revises the specific event valuation to be either lower or higher than the original value. For example, a user may report a fire loss event, and the LV computing device may determine a specific event valuation of $15,000, or the full predicted value of the user's possessions. The LV computing device may further receive inventory data indicating that the user was able to recover a television, a video game system, and a grand piano, which combined are valued at $3,000. The LV computing device may then determine a revised valuation of $12,000 (the specific event valuation less the value of recovered items). As another example, a user may report a flood loss event, and the LV computing device may determine a specific event valuation of $1,000. However, the user may have had an unusual amount of electronics that were damaged in the flood, and, based at least in part upon received inventory data, the LV computing device may determine that likely damages to good are higher than $1,000 and generate a revised valuation of $2,000.

In the exemplary embodiment, the LV computing device is configured to receive third party event data and utilize the third party event data to revise specific event valuations. Third party event data may include any data about a loss event received from a third party computer device or third party computer system, and may include data such as police report, emergency services reports, maintenance reports, security system reports, smoke detector reports, power meter reports, or any other reports, data, or information related to a loss event. The LV computing device is configured to analyze the received third party event data and determine if the specific event valuation needs to be revised, and, if so, generate a revised valuation. For example, a user may report a break-in, and the LV computing device may determine a specific event valuation of $2,000 based at least in part upon the user's loss event policy. However, the LV computing device may further receive a police report indicating that no items were stolen during the break-in, and the LV computing device may generate a revised valuation of $500 to cover a broken window.

In the exemplary embodiment, the LV computing device is further configured to generate a payout based at least in part upon a specific event valuation or a revised valuation. In one embodiment, the LV computing device determines an appropriate payout based at least in part upon a specific event valuation or revised valuation and issues the payout to a user. In another embodiment, the LV computing device generates and transmits instructions to an insurance provider device, where the instructions cause the insurance provider device to issue a payout based at least in part upon specific event valuation and/or revised valuation. In any embodiment, the payout may be equal to the specific event valuation or revised valuation, or the payout may be calculated, by the LV computing device or insurance provider device, using the specific event valuation or revised valuation.

At least one technical problems addressed by this system may include: (i) a backlog of insurance claims that needs high investment of time, processing power, and/or manpower to process; (ii) reduced processing capacity of insurance systems due to a backlog of unprocessed insurance claims; (iii) human-error introduced in the claim processing procedure; (iv) human-error introduced in determining insurance payouts; (v) inability to synthesize large amounts of user data to reliably and accurately determine personalized loss valuations; (vi) inability to quickly and accurately utilize data from multiple sources to determine and revise loss valuations as data are made available; (vii) compromised computer security by needing manual intervention during insurance claims processing.

The methods and systems described herein may be implemented using computer programming or engineering techniques including computer software, firmware, hardware, or any combination thereof, where the technical effect may be achieved by performing at least one of the following steps: (i) receive user data from the user computer device, wherein the user data include data related to a user's personal information and personal property, (ii) utilize a trained machine learning model to determine a first loss valuation associated with a first loss event based at least in part upon the user data, (iii) utilize the trained machine learning model to determine a second loss valuation associated with a second loss event based at least in part upon the user data, wherein the first loss event and the second loss event are different loss events, and/or (iv) generate a loss event policy that includes the first loss valuation and the second loss valuation.

At least one technical solution addressed by this system may include: (i) reducing the amount of energy and processing power needed to process insurance claims; (ii) reducing insurance claims backlog, thereby freeing up processing power; (iii) reducing human-error associated with insurance claims processing and determining insurance payouts, thereby reducing processing power needed to fix errors; (iv) enabling the use and organization of large amounts of previously unusable user data; (v) enabling rapid, reliable use of data from multiple sources to improve accuracy and reliability of insurance claims processing; and (vi) improving computer security by reducing manual tasks needed during insurance processing Examples of Loss Valuation Computer System for Determining Loss Event Valuations FIG. 1 is a block diagram illustrating an exemplary loss valuation ("LV") computer system 100 for generating personalized valuations for loss events and other loss event outputs. In the exemplary embodiment, analysis of input data and generation of loss-event valuations are implemented by a loss valuation ("LV") computing device 102. In one embodiment, LV computing device 102 utilizes modules to enable the functionalities described herein. In the exemplary embodiment, the modules include a communications module 112, a machine learning ("ML") module 114, a loss valuation ("LV") module 116, and a policy module 118. LV computer system 100 further includes user computer device 104, insurance provider device 106, third party computer device 108, and loss valuation database 110, all of which are in communication with LV computing device 102. In alternative embodiments, LV computer system 100 includes any number of the above mentioned components in any combination in communication with LV computing device 102.

In the exemplary embodiment, LV computing device 102 is configured to receive input data about a user (e.g., demographic data, home/property data, personal property data), analyze the input data, and determine loss event outputs, including loss event policies, loss event valuations, and revised valuations. LV computing device 102 is configured to utilize communications module 112, ML module 114, LV module 116, and policy module 118 to implement the functionalities described herein. In some embodiments, LV computing device 102 does not utilize any specific modules to implement the functionalities described herein. In other embodiments, LV computing device 102 utilizes additional and/or alternative modules to those described herein.

Communications module 112 is configured to enable communication between LV computing device 102 and any external computer devices, such as user computer device 104, insurance provider 106, third party computer device 108, and loss valuation database 110. In some embodiments, communications module 112 is a communications server, such as a database server, that enables communication between LV computing device 102 and external devices. Communications module 112 may also enable communication between the modules 114, 116, and 118 of loss valuation computer device 102.

ML module 114 enables machine learning functionality for LV computing device 102. In some embodiments, ML module 114 trains machine learning models to be used in analyzing data, generating loss valuations, and generating insurance policies. For example, ML module 114 may generate a loss valuation model for processing data inputs and predicting valuations associated with loss events. Machine learning models trained by ML module 114 may be utilized by LV module 116 and policy module 118.

LV module 116 and policy module 118 are configured to utilize machine learning models to process data and generate outputs. Specifically, LV module 116 is configured to receive user data and generate various loss event valuations. Policy module 118 is configured to receive loss event valuations and/or policyholder data and generate comprehensive loss event policies. In one embodiment, LV computing device 102 does not include policy module 118 and LV module 116 implements the functionalities of policy module 118 as described. In an alternative embodiment, LV computing device 102 transmits loss event valuations to insurance provider device 106, and insurance provider device 106 generates a loss event policy.

In the exemplary embodiment, LV computing device 102 is in communication with user computer device 104. User computer device 104 may be any computer device accessible by a user, including, but not limited to, a laptop, desktop, smartphone, tablet, or some other mobile or stationary computer device. LV computing device 102 is configured to interface with user computer device 104 such that a user of user computer device 104 may be able to input user information, retrieve policy information, receive alerts/notifications, configure settings and preferences, and otherwise interact with LV computing device 102. In alternative embodiments, user computer device 104 functions as an administrative computing device for allowing a user to configure LV computing device 102, a user computer device for allowing a user to submit and receive loss-event information, or both. In some embodiments, LV computing device 102 is in communication with a plurality of user computer devices 104.

In the exemplary embodiment, LV computing device 102 is configured to communicate with insurance provider device 106. Insurance provider device 106 may be any computer device accessible by a user, such as a laptop, desktop, smartphone, etc., or may be a server, database, or network operated by an insurance provider. LV computing device 102 may receive insurance policy information or other use information from insurance provider device 106, and may further transmit loss event outputs to insurance provider device 106. In some embodiments, LV computing device 102 may generate or transmit instructions to insurance provider device 106 that cause insurance provider device 106 to generate a payout for a user based at least in part upon a loss event valuation.

In the exemplary embodiment, LV computing device 102 is configured to communicate with third party computer device 108. Third party computer device 108 may be any computer device or computer system operated by a third party, or any computer device or computer system external to LV computing device 102. LV computing device 102 may receive event data or post-event data from third party computer device 108. For example, third party computer device 108 may include a home security system that sends data about a break-in to LV computing device 102. In another example, third party computer device 108 may include a police operations system that sends crime reports to LV computing device 102.

In the exemplary embodiment, LV computing device 102 is further configured to communicate with LV database 110. LV computing device 102 may receive any data needed for the functionality described herein from LV database 110. LV computing device 102 is configured to store and/or receive any of the data discussed herein through LV database 110. In some embodiments, LV computing device 102 communicates with LV database 110 through a database server. In some embodiments, LV database 110 is local to LV computing device 102.

Figure 2:
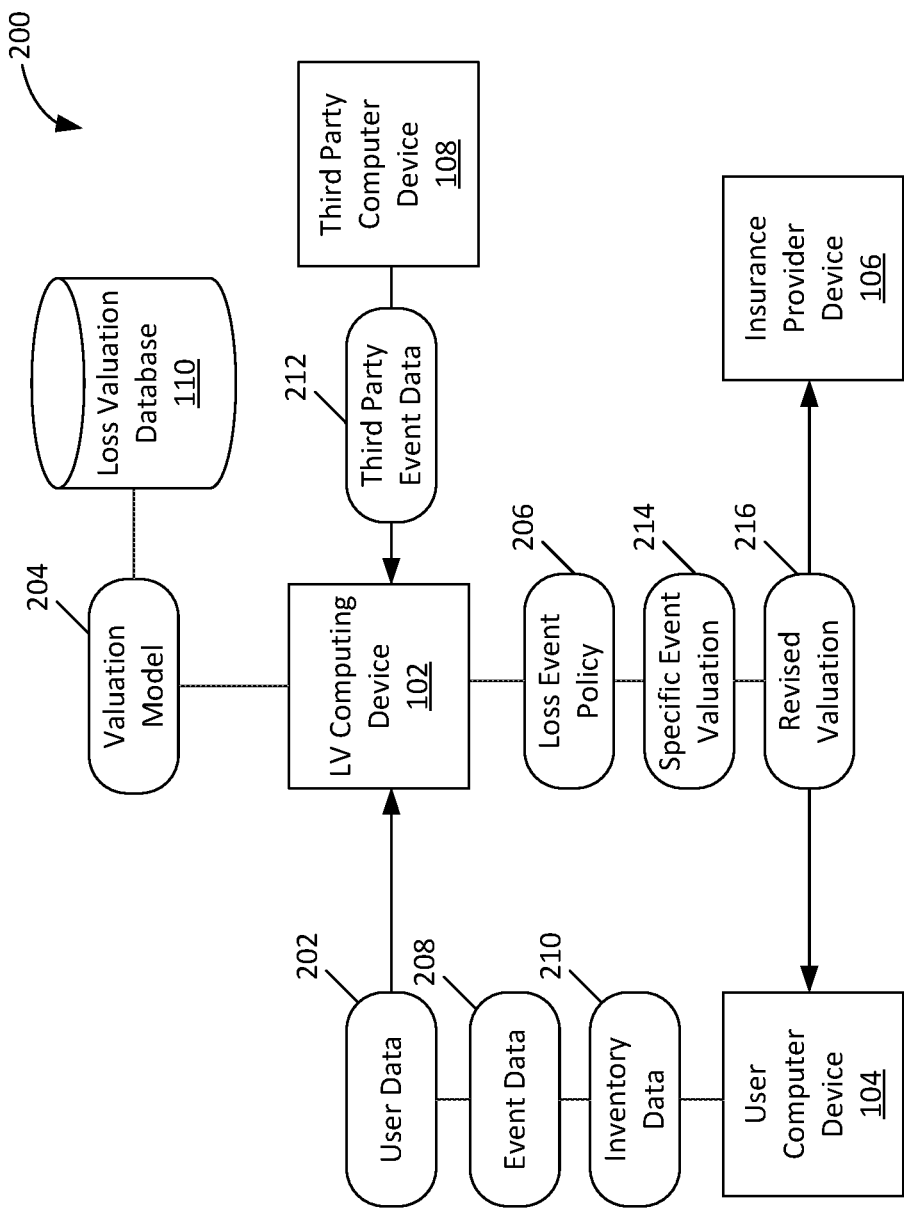
FIG. 2 is a schematic diagram illustrating a data flow through the LV computer system of FIG. 1, according to various embodiments.

Examples of Data Flow Through a Computer System for Determining Loss Event Valuations FIG. 2 depicts an exemplary data flow 200 illustrating the flow of data between LV computing device 102 and other components of LV computer system 100 (shown in FIG. 1) for determining loss event valuations. Specifically, LV computing device 102 receives information about a user and/or an event and uses a valuation model to analyze the user/event data and determine loss valuation outputs, such as a personalized loss event policy and specific-specific event valuations.

In the exemplary embodiment, LV computing device 102 is configured to receive user data 202 from user computer device 104 and valuation model 204 from LV database 110 and generate loss event policy 206 based at least in part upon user data 202. LV computing device 102 is further configured to receive event data 208 and inventory data 210 from user computer device 104 and receive third party data 212 from third party computer device 108. LV computing device 102 is configured to generate specific event valuation 214 and revised valuation 216 based at least in part upon the received data. LV computing device 102 is further configured to transmit loss event policy 206, specific event valuation 214 and revised valuation 216 to at least one of user computer device 104 and insurance provider device 106. In alternative embodiments, data flow 200 may include any number of the data types described, as well as additional and/or alternative data types.

In the exemplary embodiment, LV computing device 102 receives user data 202 from user computer device 104. User data 202 may include any demographic information, personal information, digital information, housing information, real-estate information, personal property information, location information, pet-related information, medical information, occupation, or any other type of data/information that is related to a user and/or aspects of a user's real-estate and personal property. For example, user data 202 may include, but is not limited to, age, sex, gender, marital status, size of family, age of children, number and type of pets, education level, neighborhood information, average property value, property value and value of a user's home, estimated value of a user's possessions, and amount of time owning/staying on the property, among other data points. In an alternative embodiment, LV computing device 102 receives all or a portion of user data 202 from LV database 110 and/or insurance provider device 106.

In the exemplary embodiment, LV computing device 102 receives valuation model 204 from LV database 110 and utilizes valuation model 204 to analyze user data 202. In the exemplary embodiment, valuation model 204 is a trained machine learning model capable of associating a variety of data points with loss valuations for specific types of loss events. In other words, valuation model 204 analyzes user data 202 and predicts loss valuations for each of a number of loss events. For example, based at least in part upon user data 202, LV computing device 102 may utilize valuation model 204 to predict a loss valuation for a number of events such as fire, flood, earthquake, robbery, or any other loss event. As another example, based at least in part upon user data 202 describing a user's home as an old, two-story house, LV computing device 102 may utilize valuation model 204 to predict that a fire may cause significant amounts of damage, and the loss valuation for a fire loss event will therefore be high.

LV computing device 102 predicts specific event valuations based at least in part upon both user data 202 and the specific loss event. In other words, based at least in part upon specific data about a user and/or the user's property, LV computing device 102 predicts how much damage would be incurred by specific loss events. For example, a fire in a multi-story mansion may cause significantly more monetary damage than a fire in a one-story ranch-style house. LV computing device 102 may take into account the size and layout of a house when predicting loss event damages. As another example, basement flooding may cause significantly more monetary damage in a house with a finished basement than in a house with an unfinished basement.

In the exemplary embodiment, LV computing device 102 utilizes valuation model 204 to generate loss event valuations for a number of different loss events based at least in part upon user data 202, and compiles the loss event valuations to generate loss event policy 206. In other words, LV computing device 102 generates a loss event policy 206 that indicates a number of loss events with associated predicted loss valuations. Loss events may include, but are not limited to, any natural disaster (e.g., fire, flooding, tornado, hurricane, earthquake, tsunami, hail, blizzard, etc.), system failures (e.g., electrical fire, power outage, power surge, plumbing leakage or malfunction, heating or air conditioning malfunction, etc.), or human-caused loss (e.g., negligence, arson, vandalism, theft, etc.). For example, LV computing device 102 may determine that for a specific user's property, a fire loss event is worth $10,000, a flooding loss event is worth $8,000, and a theft loss event is worth $2,000. LV computing device 102 may further compile these loss valuations into a single loss event policy 206. In alternative embodiments, loss event policy 206 may include any number of loss events with associated loss valuations.

In some embodiments, LV computing device 102 is configured to utilize valuation model 204 to determine predicted user data from user data 202. For example, LV computing device 102 may receive user data indicating the neighborhood of a house and the income of the user, and LV computing device 102 may determine a like value of the property and/or a value of the house. In another example, LV computing device 102 may utilize user data to further determine a list of items the user is likely to own, and/or a likely value of the user's personal possessions. In some embodiments, LV computing device 102 determines user-related information and generates separate outputs for the user-related information. LV computing device 102 may then utilize these outputs in generating loss valuations and loss event policy 206. In other embodiments, LV computing device 102 generates loss valuations and loss event policy 206 without the intermediary step of generating separate user-related outputs based at least in part upon user data 202. For example, rather than determine a list of items a user is likely to own and a predicted value for the items, LV computing device 102 may utilize a model that analyzes user data and generates a loss valuation for a fire that intrinsically takes into account the likely value of a user's possessions, without separately determining and outputting the value of the user's possessions.

In one embodiment, the specific loss events for which LV computing device 102 determines loss valuations are determined by valuation model 204. In another embodiment, a list of loss events to include in loss event policy 206 is received from insurance provider device 106 or LV database 110. In some embodiments, the types of loss events included in loss event policy 206 are based at least in part upon user data 202. For example, a loss event policy may include loss valuations for forest fires but not tornados for a user living in California. In another embodiment, loss even policy 206 defines loss valuations for a set list or set number of loss events regardless of the user.

In some embodiments, LV computing device 102 generates loss event policy 206 to include loss events with varying levels/tiers. For example, a "fire" loss event may include "low", "medium", and "high" levels for the significance of the loss event. In some embodiments, each loss event as described above may be considered a loss event category, and each loss event category includes different types or levels within the category. For example, a loss event category for "theft" may include sub-types "forced entry" or "non-forced entry", along with levels for each sub-type including "high", "medium", or "low" damage/loss. As another example, a "flooding" loss event category may include areas of the flooding, such as "basement", "first floor", "second floor", and "multiple floors", along with options for the length of time the flooding was present, such as "less than 12 hours", "between 12 and 24 hours", and "greater than 24 hours". In alternative embodiments, LV computing device 102 may determine valuations for any combination of loss events, loss event categories, loss event sub-types, and loss event levels/tiers as described.

In the exemplary embodiment, LV computing device 102 is further configured to receive event data 208 from user computer device 104 and generate specific event valuation 214. In one embodiment, event data 208 includes a user selection of a type of loss event. In other words, user computer device 104 may capture user input selecting a specific loss event, and the user selected loss event is transmitted to LV computing device 102 as event data 208. For example, a user may log in to an application, select that a loss event has occurred, and select that the loss event was a fire. In another embodiment, event data 208 includes qualitative or quantitative descriptions of a loss event, and may include, but is not limited to, user audio description, user text description, user selection from a variety of loss event categories, sub-types, and levels, user photos or videos, or any other medium through which a user may describe a loss event.

Based at least in part upon event data 208, LV computing device 102 is configured to analyze event data 208 and generate specific event valuation 214. In one embodiment, LV computing device 102 compares event data 208 to loss event policy 206 and determines specific event valuation 214 based at least in part upon the comparison. As another example, event data 208 may indicate the loss event was internal flooding in the basement that lasted for between 12 and 24 hours. LV computing device 102 may compare event data 208 with loss event policy 206 and determine that for a basement flood lasting between 12 and 24 hours, specific event valuation 214 is $5,000.

In another embodiment, LV computing device 102 event data 208 using analysis techniques including, but not limited to, natural language processing ("NLP"), image recognition, video analysis, voice recognition, segmentation analysis, optical character recognition ("OCR"), and facial recognition, among other techniques, and determines the category, type, and/or significance of the loss event. For example, event data 208 may indicate that the loss event is a fire and may further include images of the fire. LV computing device 102 may analyze the images of the fire and determine the fire has a damage level of "high". LV computing device 102 may determine that loss event policy 206 values a high-damage fire at $30,000 and generate specific event valuation 214 indicating a $30,000 loss valuation.

In the exemplary embodiment, LV computing device 102 is configured to revise loss valuations, such as event loss valuations, specific event valuation 214, and revised valuation 216 based at least in part upon receiving additional data inputs. In other words, after determining a loss event valuation, LV computing device 102 may receive additional data that necessitates an alteration of the loss event valuation. Specifically, LV computing device 102 is configured to receive at least one of inventory data 210 and/or third party event data 212, analyze the data in relation to event data 208 and specific event valuation 214, and determine that specific event valuation 214 should be revised in light of the new data. LV computing device 102 further re-calculates the estimated loss valuation and generates revised valuation 216.

In the exemplary embodiment, LV computing device 102 is configured to receive additional data inputs (e.g., inventory data 210 and/or third party event data 212), analyze the additional data inputs, and determine that a revised valuation should be generated. In one embodiment, LV computing device 102 generates a new specific event valuation based at least in part upon the additional data inputs, compares the new specific event valuation to specific event valuation 214, and determines a revised valuation needs to be generated based at least in part upon the comparison (e.g., if the new specific event valuation and specific event valuation 214 differ at all or by a predetermined amount/threshold). In another embodiment, LV computing device 102 determines a qualitative or quantitative impact that the additional data inputs might have on specific event valuation 214 and determines that a revised valuation should be calculated based at least in part upon the potential impact of the additional data inputs. For example, if LV computing device 102 generates a specific event valuation for a "small fire" and receives third party event data indicating that the fire was large, the LV computing device 102 may determine that the third party event data would have a large impact if incorporated into the loss valuation. LV computing device 102 may then, therefore, generate revised valuation 216 incorporating the new data about the size of the fire.

In one embodiment, LV computing device 102 receives inventory data 210 from a user indicating items the user is able to recover from a loss event. For example, a high-damage fire loss event may be reported by the user, and LV computing device 102 may determine a specific event valuation based at least in part upon the user's loss event policy that indicates a high-damage fire loss event is worth $15,000. However, the user may additionally report that the he/she was able to recover a television worth $1,000 and a video game system worth $500. Based at least in part upon the recovered items, LV computing device 102 may revise the loss event valuation to $13,500 ($15,000 loss valuation less the $1,500 recovered items).

In another embodiment, LV computing device 102 receives third party event data 212 from a third party computer system. Third party event data 212 may include any data related to a loss event that is received from a third party computer system. Third party event data 212 may include, but is not limited to, police reports, emergency services reports, fire services reports, security systems reports, fire alarm data, flooding/standing water sensor data, other sensor data, and any other data related to a loss event. For example, a forced-entry, low-damage theft loss event may be reported by a user, and LV computing device 102 may determine a specific event valuation based at least in part upon the user's loss event policy that indicates the loss event is worth $1,000. However, if a police report were received by LV computing device 102 indicating that no items were stolen, LV computing device 102 may alter the specific event valuation to reflect the fact that there were no stolen items (e.g., the specific event valuation may be $0 or some other small sum to cover costs associated with the forced entry).

In alternative embodiments, LV computing device 102 is configured to utilize additional data (e.g., inventory data 210, third party event data 212, and/or any other additional data) to generate event loss valuations (e.g., as in loss valuations included in loss even policy 206) and specific event valuations 214. Specifically, LV computing device 102 is configured to receive third party event data 212 and inventory data 210 prior to generating loss valuations and/or specific event valuation 214, such that LV computing device generates event loss valuations and/or specific event valuation 214 based at least in part upon any of the received additional data.

In one embodiment, LV computing device 102 uses additional data to determine loss valuations for loss events and/or determine information about a user's home/personal property. For example, LV computing device 102 may receive inventory data indicating a large amount of expensive possessions owned by a user and estimate the value of a user's personal property based at least in part upon the inventory data. LV computing device 102 may then update user data to include the new personal property values and generate event loss valuations for loss event policy 206 based up the updated user data.

In one embodiment, LV computing device 102 utilizes any of the received data types to determine the loss event, loss event category, loss event sub-type, and/or loss event damage level. For example, LV computing device 102 may receive third party event data from a security system indicating a window was broken, but no one entered the house after the alarm went off. LV computing device 102 may utilize the third party event data to determine that the loss event is a forced-entry break in where no items were stolen, and further determine an appropriate specific event valuation based at least in part upon user's loss event policy.

In another embodiment, LV computing device 102 utilizes at least one of inventory data 210 and third party event data 212 to further inform categorization of a loss event based at least in part upon event data 208. For example, LV computing device 102 may receive event data from a user indicating a high-damage fire event has occurred, along with inventory data indicating a large amount of personal possessions have been recovered by the user and third party event data from an emergency services computer system indicating the fire was small and quickly extinguished. LV computing device 102 may utilize the event data, inventory data, and third party event data to determine that the fire event should be categorized as "low-damage" rather than "high-damage", and determine an specific event valuation for a low-damage fire event based at least in part upon the loss event policy.

In another embodiment, LV computing device 102 is configured to utilize additional data to determine specific event valuation 214. Specifically, LV computing device 102 is configured to receive event data 208, inventory data 210, and third party event data 212, and generate specific event valuation 214 based at least in part upon the received data. For example, LV computing device 102 may receive event data reporting a break-in along with third party event data of a police report indicating no items were stolen. LV computing device 102 may compare the event data and the third party event data to a loss event policy and determine that, since no items were stolen, the break-in is valued at $100 (e.g., some amount of money to cover repairs due to the break in).

In the exemplary embodiment, LV computing device 102 is further configured to generate a payout based at least in part upon specific event valuation 214 and/or revised valuation 216. In one embodiment, LV computing device 102 determines an appropriate payout based at least in part upon specific event valuation 214 and/or revised valuation 216 and issues the payout directly to a user. In another embodiment, LV computing device 102 generates and transmits instructions to insurance provider device 106, where the instructions cause insurance provider device 106 to issue a payout. In any embodiment, the payout may be equal to specific event valuation 214 or revised valuation 216, or the payout may be calculated, by LV computing device 102 or insurance provider device 106, using specific event valuation 214 or revised valuation 216.

Examples of Machine Learning Data Flow

Figure 3:
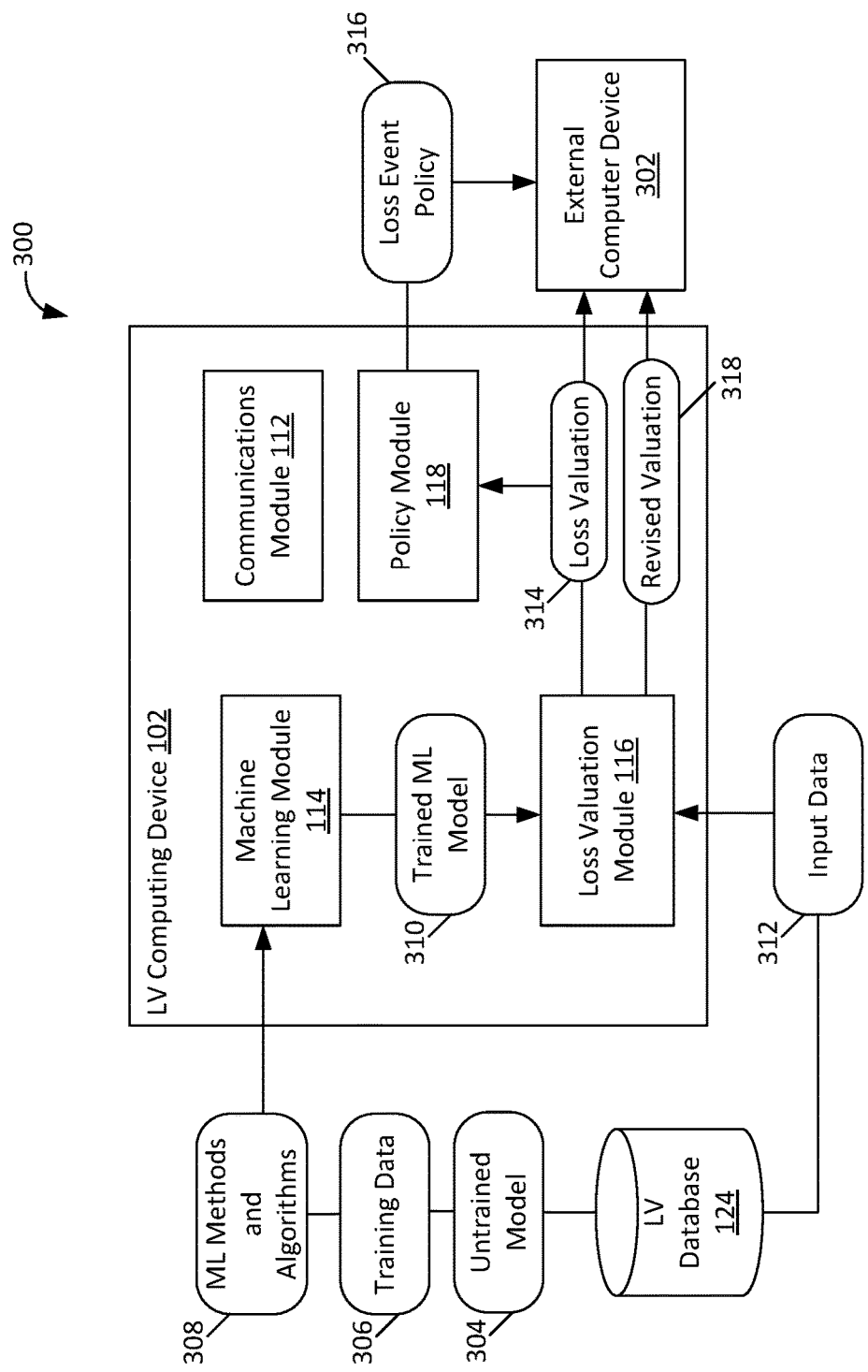
FIG. 3 is a schematic diagram illustrating a data flow through modules of a loss valuation ("LV") computing device included in the LV computer system of FIG. 1, according to various embodiments.

FIG. 3 depicts an exemplary data flow 300 through modules of LV computing device 102. In the exemplary embodiment, LV computing device 102 includes communications module 112, machine learning module 114, loss valuation module 116, and policy module 118. LV computing device 102 may utilize any number of the described modules in any combination to implement any of the functionality as described herein. Additionally, LV computing device 102 may utilize any number of additional modules or alternative modules to implement any of the functionality as described herein. For example, LV computing device 102 may utilize modules to enable analysis techniques such as, but not limited to, natural language processing ("NLP"), image recognition, video analysis, voice recognition, segmentation analysis, optical character recognition ("OCR"), and facial recognition, among other techniques.

In the exemplary embodiment, communications module 112 is configured to enable communications between LV computing device 102 and any external computer devices as well as enable communication between modules of LV computing device 102. In one embodiment, communications module 112 acts as a server for connecting LV computing device 102 to external computer devices and/or databases.

In the exemplary embodiment, machine learning ("ML") module 114 is configured to train loss valuation models for use by LV computing device 102 in analyzing and determining specific event valuations. In general, ML module 114 enables LV computing device 102 to "learn" to analyze data, generate specific event valuations, generate loss event policies, and revise loss event valuations. Specifically, ML module 114 is configured to receive an untrained machine learning model 304 along with training data 306, process training data 306 using machine learning "ML" methods and algorithms 308, and generate a trained machine learning model 310 (e.g., a specific event valuation model) after processing training data 306. In the exemplary embodiment, ML module 114 receives untrained model 304, training data 306, and ML methods and algorithms 308 from loss valuation ("LV") database 124.

In one embodiment, untrained model 304 may be any function, decision making model, or prediction model with undefined or under-defined elements (e.g., undefined function coefficients). In the exemplary embodiment, ML module 114 is configured to define the elements of untrained model 304 by processing training data 306 using ML methods and algorithms 308. In one embodiment, ML module 114 is configured to receive and re-define the elements of an already trained ML model.

In the exemplary embodiment, training data 306 includes any real-time or historical data that may be used as an input for training untrained model 304. Training data 306 may be organized (e.g., as in training data used for supervised learning) or unorganized (e.g., as in training data used for unsupervised learning). Specifically, training data 306 may include any of the data inputs mentioned herein, including, but not limited to: user data, event data, inventory data, third party event data, event loss valuations, loss event policies, specific event valuations, and revised valuations. For example, training data 306 may include historical user income and associated housing values. As another example, training data 306 may include historical real-estate values along with associated personal property values. As another example, training data 306 may include real-estate values along with associated damages paid out for various loss events. As yet another example, training data 306 may include unorganized user income data, house-value data, event loss data for specific events, and police report data all associated with particular users.

In the exemplary embodiment, ML module 114 utilizes ML methods and algorithms 308 to process training data 306 and define the elements of untrained model 304, thereby generating trained ML model 310. In other words, ML module 114 utilizes ML methods and algorithms 308 to identify patterns within data, test loss valuation predictions, and define functions (e.g., the elements of untrained model 304) that enable prediction of accurate loss event valuations based at least in part upon novel inputs. For example, ML module 114 may utilize ML methods and algorithms 308 to identify a relationship between loss events and associated reported damages. As another example, ML module 114 may identify relationships between unorganized data such as user-income, user-inventory reports, reported damages over a period of time, and police reports. In the exemplary embodiment, ML module 114 captures these relationships by defining the elements of untrained model 304.

ML module 114 is configured to utilize a variety of ML methods and algorithms 308 including, but not limited to: linear or logistic regression, instance-based algorithms, regularization algorithms, decision trees, Bayesian networks, cluster analysis, association rule learning, artificial neural networks, deep learning, dimensionality reduction, and support vector machines. ML methods and algorithms 308 are generally directed toward at least one of a plurality of categorizations of machine learning, including supervised learning methods, unsupervised learning methods, and reinforcement learning methods.

In one embodiment, ML module 114 utilizes supervised learning methods, which involve defining relationships in organized and/or labeled data to make predictions about subsequently received data. Using supervised learning methods, ML module 114 receives training data 306 that includes training inputs and associated training outputs. For example, training data for a model used to estimate fire damage based at least in part upon images of fire-damaged property may include images of fire-damaged property (data inputs) and associated values for total monetary damages needed to repair the property (data outputs). ML module 114 is configured to process training data 306 using supervised learning algorithms and generate trained ML model 310 that effectively maps inputs to outputs. Specifically, ML module 114 may utilize a supervised algorithm to identify relationships between the images of fire-damaged property and the total monetary damages needed to resolve the fire-damage and define a trained ML model based at least in part upon the identified relationships. The trained ML model may then be able to receive images of fire-damaged property and estimate a total cost (or range of costs) to repair or replace the fire-damaged property.

In another embodiment, ML module 114 utilizes unsupervised learning methods, which involve finding meaningful relationships in unorganized data. Unlike supervised learning methods, unsupervised learning methods do not utilize training data with labeled inputs and associated outputs. Rather, the training data are unorganized, and ML module 114 utilizes unsupervised learning methods to determine or identify relationships within the training data and generate trained ML model 310 that effectively maps these relationships. For example, ML module 114 may receive training data 306 including property values across different neighborhoods, police reports of theft and break-ins, and reported damages associated with break-ins in different neighborhoods. ML module 114 is configured to process the training data using an unsupervised ML method and identify relationships within the data. ML module 114 is further configured to utilize these identified relationships to define trained ML model 310. Specifically, ML module 114 may utilize an unsupervised method to identify a relationship between neighborhood property values and the value of items stolen in the event of a break-in. ML module 114 may then determine a function describing this relationship, and generate trained ML model 310 based at least in part upon the function. Trained ML model 310 may then be used to predict the average damages associated with break-ins based at least in part upon the neighborhood the house is in.

In the exemplary embodiment, ML module 114 generates trained ML model 310 for use by loss valuation module 116. Specifically, ML module 114 is configured to generate a trained ML model 310 that enables loss valuation module 116 to more accurately predict loss valuations for a specific user and revise the loss valuations in light of additional information. In one embodiment, ML module 114 generates a single ML model 310 that enables multiple functionalities associated with loss valuation module 116 and/or LV computing device 102. In alternative embodiments, ML module 114 generates any number of trained ML models 310 to enable various functionalities associated with loss valuation module 116 and/or LV computing device 102.

In the exemplary embodiment, loss valuation module 116 is configured to receive trained ML model 310, where trained ML model 310 is trained to determine loss valuation 314 (e.g., event loss valuations for an event policy and/or specific event valuations) and/or revised valuation 318 based at least in part upon input data 612. Input data 612 may be any data type described herein, such as the data types described above. Loss valuation module 116 is configured to receive input data 612, utilize trained ML model 310 to process input data 612, and generate loss valuation 314 based at least in part upon the outputs of trained ML model 310. Loss valuation module 116 is further configured to transmit loss valuation 614 to policy module 118 and/or external computer device 602.

Loss valuation module 116 is further configured to receive additional input data 312, utilize trained ML model 310 to analyze the additional input data 312, and generate revised valuation 318 based at least in part upon the analysis. In some embodiments, loss valuation module 116 generates revised valuation 318 based at least in part upon new input data 312 and loss valuation 314, such as by applying new input data 312 to already generated loss valuation 314 and altering loss valuation 314 to take into account the new input data 312. In another embodiment, loss valuation module 116 generates revised valuation 318 based at least in part upon all input data 312 received, generating a completely new revised valuation 318 rather than altering an existing loss valuation 314. Loss valuation module 116 is further configured to transmit revised valuation 318 to external computer device 302. In some embodiments, trained ML model 310 is configured to generate both loss valuation 314 and revised valuation 318. In other embodiments, loss valuation module 116 utilizes multiple, separate trained ML models 310 for generating loss valuation 314 and revised valuation 318.

In the exemplary embodiment, policy module 118 is configured to receive at least one loss valuation 314 from loss valuation module 116. Policy module 118 is configured to generate loss event policy 316 based at least in part upon loss valuation 314. In an exemplary embodiment, policy module 118 receives multiple loss valuations 314 and compiles loss valuations 314 into a single loss event policy 316. Policy module 118 is further configured to transmit loss event policy 316 to external computer device 302 and/or LV module 116. In an alternative embodiment, policy module 118 receives trained ML model 310 and utilizes trained ML model 310 to generate loss event policy 316. Specifically, policy module 118 may utilize ML model 310 to compile event loss valuations, determine which loss valuations 314 to include in loss event policy 316, and/or to determine valuations for specific levels or types of loss events. For example, policy module 118 may receive loss valuations 314 from loss valuation module 116 indicating a base value for a fire loss event, and policy module 118 may determine the loss valuation for "low", "medium" and "high" damage fires.

Examples of Policyholder Devices

Figure 4:
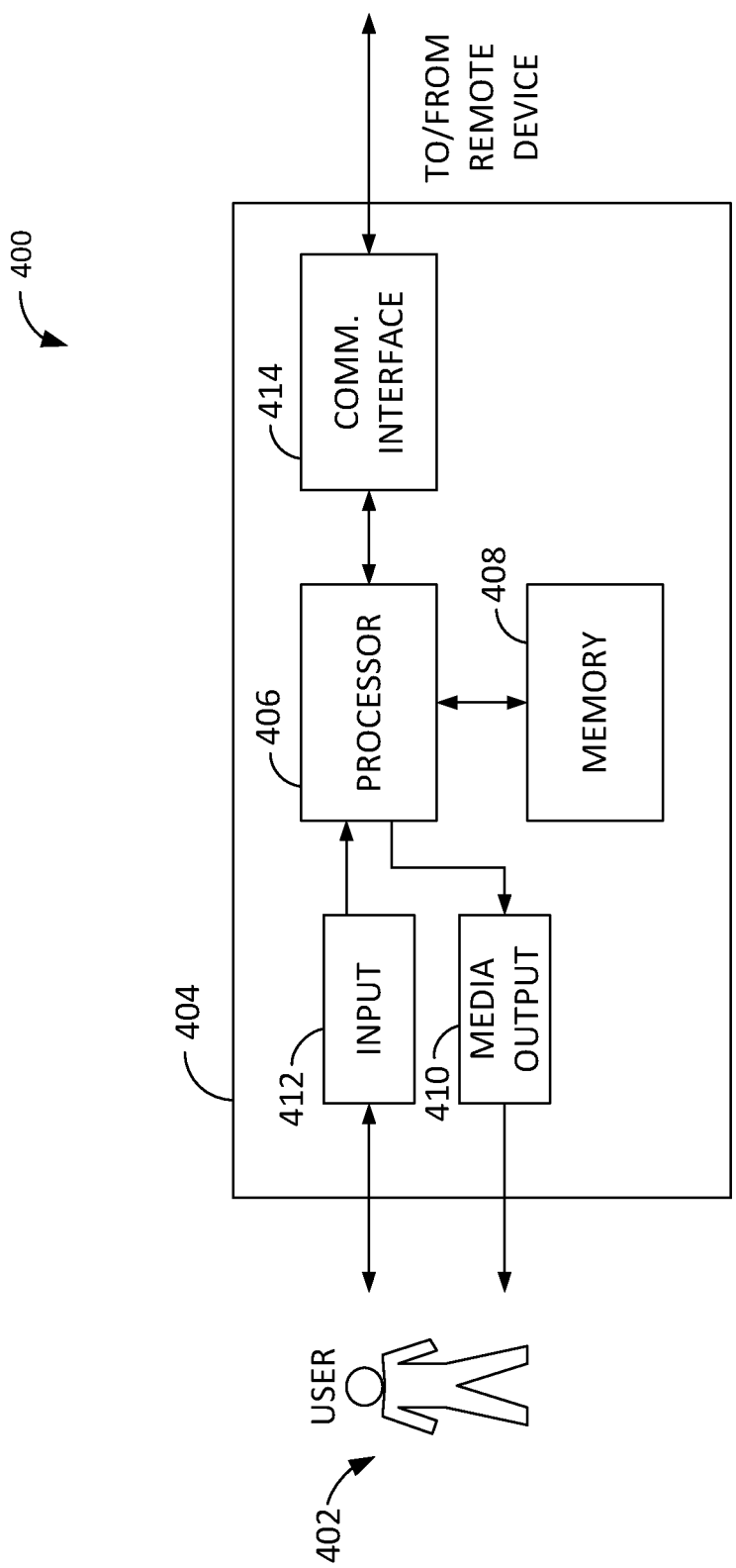
FIG. 4 illustrates a configuration of a user computer device that may be used with the LV computer system shown in FIG. 1, according to various embodiments.

FIG. 4 depicts an exemplary configuration 400 of a user computer device 404 (e.g., user computer device 104, shown in FIGS. 1 and 2), in accordance with one embodiment of the present disclosure. User computer device 404 may be operated by a user 402. User computer device 404 may include, but is not limited to, user computer device 104, insurance provider device 106, and third party computer device 108 (all shown in FIG. 1). User computer device 404 may include a processor 406 for executing instructions. In some embodiments, executable instructions may be stored in a memory 408. Processor 406 may include one or more processing units (e.g. in a multi-core configuration). Memory 408 may be any device allowing information such as executable instructions and/or transaction data to be stored and retrieved. Memory 408 may include one or more computer readable media.

User computer device 404 may also include one media output component 410 for presenting information to user 402. Media output component 410 may be any component capable of conveying information to user 402. In some embodiments, media output component 410 may include an output adapter (not shown) such as a video adapter and/or an audio adapter. An output adapter may be operatively coupled to processor 406 and operatively coupleable to an output device such as a display device (e.g. a cathode ray tube (CRT), liquid crystal display (LCD), light emitting diode (LED) display, or "electronic ink" display) or an audio output device (e.g. a speaker or headphones).

In some embodiments, media output component 410 may be configured to present a graphical user interface (e.g. a web browser and/or a client application) to user 402. A graphical user interface may include, for example, an online store interface for viewing and/or interacting with inventories, requests, documentation, etc. (shown in FIG. 2). In some embodiments, User computer device 404 may include an input device 412 for receiving input from user 402. User 402 may use input device 412 to, without limitation, update and/or adjust inventories and provide documentation.

Input device 412 may include, for example, a keyboard, a pointing device, a mouse, a stylus, a touch sensitive panel (e.g. a touch pad or a touch screen), a gyroscope, an accelerometer, a position detector, a biometric input device, and/or an audio input device. A single component such as a touch screen may function as both an output device of media output component 410 and input device 412.

User computer device 404 may also include a communication interface 414, communicatively coupled to a remote device such as LV computing device 102 (shown in FIG. 4). Communication interface 414 may include, for example, a wired or wireless network adapter and/or a wireless data transceiver for use with a mobile telecommunications network.

Stored in memory 408 are, for example, computer readable instructions for providing a user interface to user 402 via media output component 410 and, in certain examples, receiving and processing input from input device 412. A user interface may include, among other possibilities, a web browser and/or a client application. Web browsers enable users, such as user 402, to display and interact with media and other information typically embedded on a web page or a website from LV computing device 102. A client application may allow user 402 to interact with, for example, LV computing device 102. For example, instructions may be stored by a cloud service, and the output of the execution of the instructions sent to the media output component 410.

Examples of Server Devices

Figure 5:
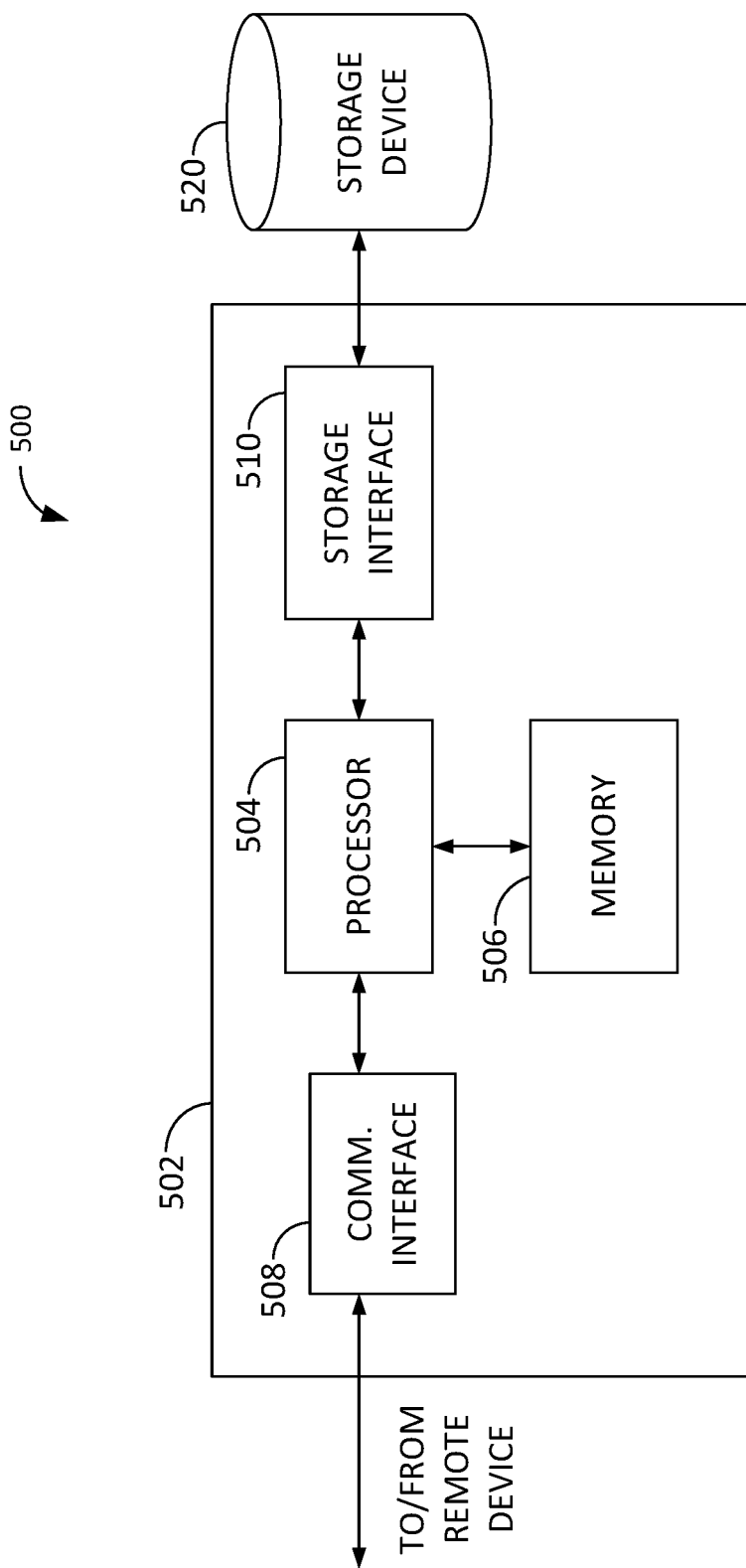
FIG. 5 illustrates a configuration of a server system that may be used with the LV computer system shown in FIG. 1, according to various embodiments.

FIG. 5 depicts an exemplary configuration 500 of a server system, in accordance with one embodiment of the present disclosure. Server computing device 502 may include, but is not limited to, LV computing device 102 (shown in FIG. 1). Server computing device 502 may also include a processor 504 for executing instructions. Instructions may be stored in a memory area 506. Processor 504 may include one or more processing units (e.g. in a multi-core configuration).

Processor 504 may be operatively coupled to a communication interface 508 such that server computing device 502 is capable of communicating with a remote device such as another server computing device 502, LV computing device 102, insurance provider device 106, third party computer device 108, and user computer device 104 (all shown in FIG. 1).

Processor 504 may also be operatively coupled to a storage device 520. Storage device 520 may be any computer-operated hardware suitable for storing and/or retrieving data, such as, but not limited to, data associated with loss valuation database 110 (shown in FIG. 1). In some embodiments, storage device 520 may be integrated in server computing device 502. For example, server computing device 502 may include one or more hard disk drives as storage device 520.

In other embodiments, storage device 520 may be external to server computing device 502 and may be accessed by a plurality of server computing devices 502. For example, storage device 520 may include a storage area network (SAN), a network attached storage (NAS) system, and/or multiple storage units such as hard disks and/or solid state disks in a redundant array of inexpensive disks (RAID) configuration.

In some embodiments, processor 504 may be operatively coupled to storage device 520 via a storage interface 510. Storage interface 510 may be any component capable of providing processor 504 with access to storage device 520. Storage interface 510 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 520.

Processor 504 may execute computer-executable instructions for implementing aspects of the disclosure. In some embodiments, the processor 504 may be transformed into a special purpose microprocessor by executing computer-executable instructions or by otherwise being programmed.

Examples of Computer Devices

Figure 6:
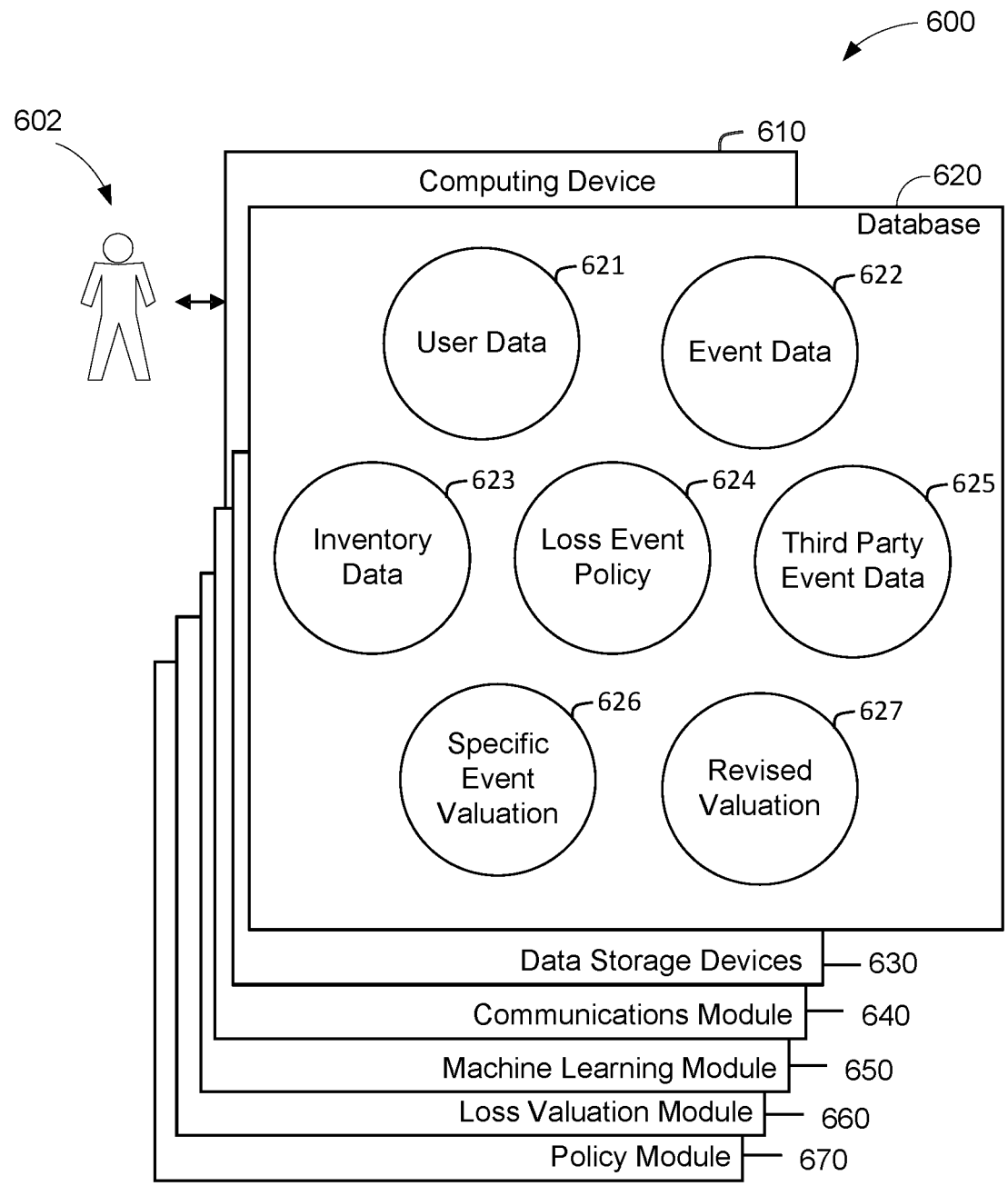
FIG. 6 illustrates a diagram of components of one or more computing devices that may be used in the LV computer system shown in FIG. 1, according to various embodiments.

FIG. 6 depicts a diagram 600 of components of one or more exemplary computing devices 610 that may be used in LV computer system 100 (shown in FIG. 1). In some embodiments, computing device 610 may be similar to LV computing device 102 (shown in FIG. 1). Database 620 may be coupled with several separate components within computing device 610, which perform specific tasks. In this embodiment, database 620 may include user data 621, event data 622, inventory data 623, loss event policy 624, third party event data 625, specific event valuation 626, and revised valuation 627. In some embodiments, database 620 is similar to loss valuation database 110 (shown in FIG. 1).

Computing device 610 may include database 620, as well as data storage devices 630, which may include additional local memory. Computing device 610 may also include a communications module 640 (e.g., communications module 112, shown in FIG. 1) that enables communication between computing device 610 and any external computing device and communication between the different components and modules of computing device 610. Computing device 610 may further include machine learning module 650 (e.g., machine learning module 114), which enables computing device 610 to "learn" from historical and real-time data and generate and update trained machine learning modules used for generating loss valuations. Moreover, computing device 610 may include loss valuation module 660 (e.g., loss valuation module 116) for generating loss valuations (e.g., loss valuations in loss event policy 624, specific event valuation 626 and revised valuation 627) based at least in part upon at least user data 621. Additionally, computing device 610 may include policy module 670 (e.g., policy module 118) for compiling loss valuations into a personalized loss event policy for a user or policyholder. Computing device 610 may include additional, less, or alternate functionality, including that discussed elsewhere herein.

Figure 7:
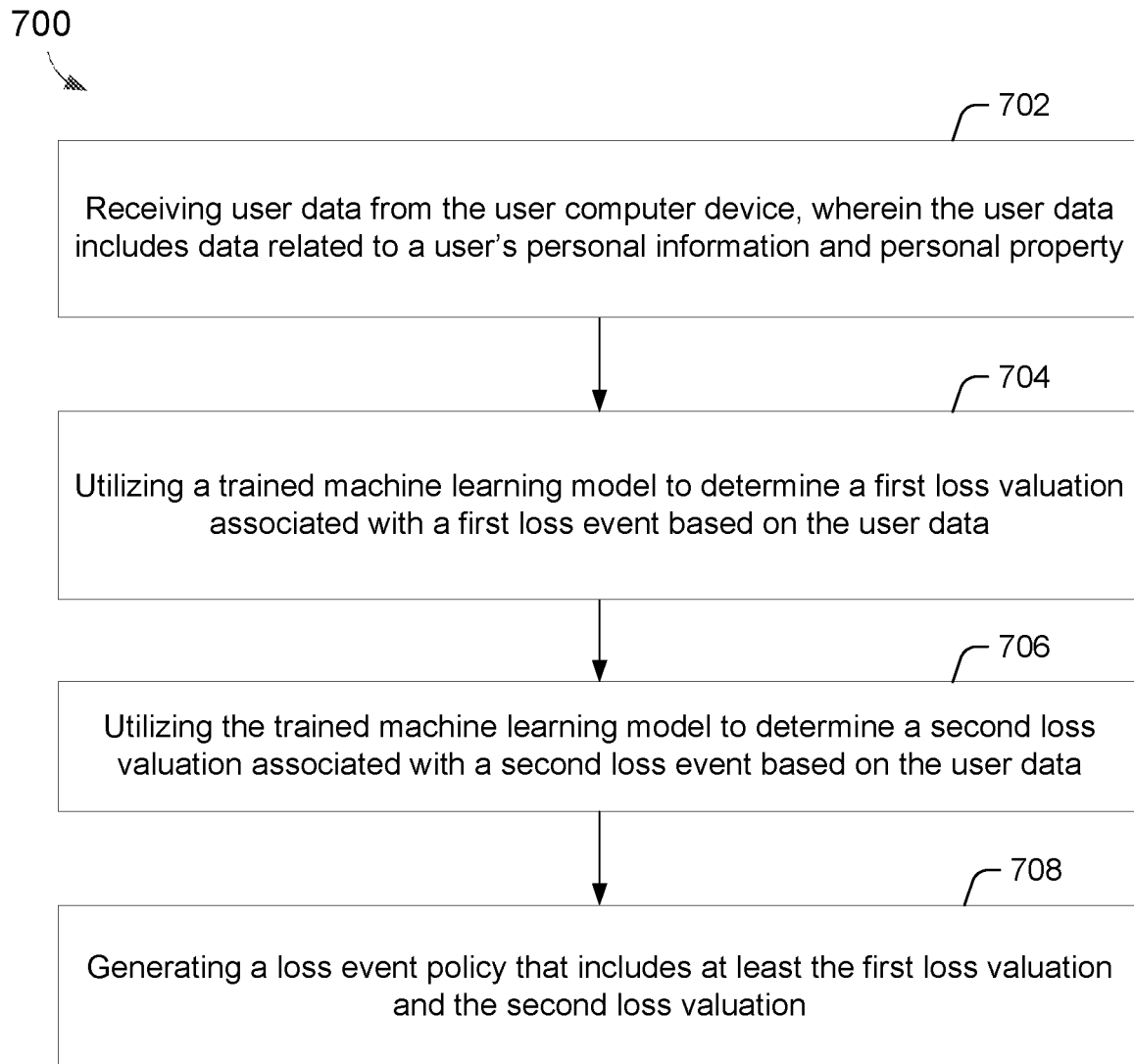
FIG. 7 illustrates a flow chart of a computer-implemented process for generating personalized loss event valuations that may be carried out by the LV computer system shown in FIG. 1, according to various embodiments.

Examples of Computer-Implemented Method for Generating and Maintaining an Inventory of Personal Possessions FIG. 7 illustrates a flow chart of an exemplary computer implemented method 700 for generating a personalized loss event policy for a user. Method 700 may be carried out by LV system 100 (shown in FIG. 1), and more specifically, may be carried out by a processor (e.g., processor 404 shown in FIG. 4) of LV system 100 or a processor of LV computing device 102.

In the exemplary embodiment, method 700 includes receiving 702 user data from the user computer device, wherein the user data include data related to a user's personal information and personal property. Method 700 further includes utilizing 704 a trained machine learning model to determine a first loss valuation associated with a first loss event based at least in part upon the user data and utilizing 706 the trained machine learning model to determine a second loss valuation associated with a second loss event based at least in part upon the user data. Additionally, method 700 includes generating 708 a loss event policy that includes the first loss valuation and the second loss valuation.

Examples of Embodiments & Functionality

In one embodiment, a computer system for determining personalized loss event valuations is provided. The computer system includes one processor in communication with at least one memory device, and the at least one processor is programmed to: (i) receive user data from the user computer device, wherein the user data include data related to a user's personal information and personal property, (ii) utilize a trained machine learning model to determine a first loss valuation associated with a first loss event based at least in part upon the user data, (iii) utilize the trained machine learning model to determine a second loss valuation associated with a second loss event based at least in part upon the user data, wherein the first loss event and the second loss event are different loss events, and/or (iv) generate a loss event policy that includes the first loss valuation and the second loss valuation. The computer system may include additional, less, or alternate functionality, including that discussed elsewhere herein.

For example, the processor may be further programmed to: (i) receive event data associated with a particular event, wherein the event data include a description of the event, (ii) compare the event data to the loss event policy to determine whether the event matches at least one of the first loss event and the second loss event, (iii) in the case that the event matches at least one of the first loss event and the second loss event, generate a specific event valuation based at least in part upon the loss valuation associated with the at least one of the first loss event and the second loss event, (iv) generate a recommended insurance payout based at least in part upon the specific event valuation, (v) transmit the recommended insurance payout to an insurance provider computer device, (vi) receive third party event data associated with the particular event from a third party computer device, wherein the third party event data include data related to the event, (vii) analyze the third party event data in combination with at least one of the event data, loss event policy, and specific event valuation, (viii) generate a revised valuation based at least in part upon the analysis, (ix) receive inventory data associated with the particular event from a user computer device, wherein the inventory data include an inventory of goods of a user affected by the particular event, (x) analyze the inventory data in combination with at least one of the event data, loss event policy, and specific event valuation, and/or (xi) generate a revised valuation based at least in part upon the analysis.

Further, the processor may be further programmed to: (i) generate the trained machine learning model by training an untrained machine learning model, (ii) receive an untrained machine learning model including one undefined function, (iii) receive training data, and/or (iv) process the training data using at least one machine learning algorithm in order to define at the at least one undefined function.

In another embodiment, a computer-implemented method for determining personalized loss event valuations is provided. The method is implemented by a computer system including one processor, and the method includes: (i) receiving user data from the user computer device, wherein the user data include data related to a user's personal information and personal property, (ii) utilizing a trained machine learning model to determine a first loss valuation associated with a first loss event based at least in part upon the user data, (iii) utilizing the trained machine learning model to determine a second loss valuation associated with a second loss event based at least in part upon the user data, wherein the first loss event and the second loss event are different loss events, and/or (iv) generating a loss event policy that includes the first loss valuation and the second loss valuation. The computer implemented method may include additional, less, or alternate actions, including those discussed elsewhere herein.

In yet another embodiment, at least one non-transitory computer-readable storage media having computer-executable instructions embodied thereon for determining personalized loss event valuations is provided. When executed by at least one processor, the computer-executable instructions cause the processor to: (i) receive user data from the user computer device, wherein the user data include data related to a user's personal information and personal property, (ii) utilize a trained machine learning model to determine a first loss valuation associated with a first loss event based at least in part upon the user data, (iii) utilize the trained machine learning model to determine a second loss valuation associated with a second loss event based at least in part upon the user data, wherein the first loss event and the second loss event are different loss events, and/or (iv) generate a loss event policy that includes the first loss valuation and the second loss valuation. The computer-executable instructions may provide additional, less, or alternate functionality, including that discussed elsewhere herein.

Examples of Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based at least in part upon example inputs in order to make valid and reliable predictions for novel inputs. For example, models may be created based at least in part upon historical policyholder data to predict what personal possessions are associated with users, and more specifically, the personal data of users (e.g., demographics and/or location data).

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based at least in part upon the discovered rule, accurately predict the correct output. In unsupervised machine learning, the processing element may be needed to find its own structure in unlabeled example inputs. In one embodiment, machine learning techniques may be used to extract data about the computer device, the user of the computer device, driver and/or vehicle, home owner and/or home, renter, geolocation information, image data, home sensor data, and/or other data.

Based at least in part upon these analyses, the processing element may learn how to identify characteristics and patterns that may then be applied to analyzing sensor data, authentication data, image data, mobile device data, and/or other data. For example, the processing element may learn, with the user's permission or affirmative consent, to predict new personal possessions of the user (e.g., that the user acquires after the actual inventory has been created and/or generated).

Additional Considerations in Certain Embodiments

As will be appreciated based at least in part upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g. an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g. magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable medium. In an exemplary embodiment, the system is executed on a single computer system, without needing a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system may include multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed:

1. A computer system for determining personalized loss event valuations, the computer system including one or more processors, the one or more processors programmed to:

receive user data from a user computer device, wherein the user data include data related to personal information and personal property of a user, wherein the user data comprise a user income, a real-estate value associated with the user, and one or more first images of the personal property of the user;

utilize a trained machine learning model to determine a first loss valuation associated with a first type of loss event based at least in part upon the user data, wherein the trained machine learning model comprises a convolutional neural network, wherein the trained machine learning model is trained, based on features comprising (i) training input data comprising user incomes, real-estate values, and one or more images of damaged property, and (ii) training output data comprising event loss values, using a supervised learning algorithm that identifies functional relationships and maps the training input data to the training output data, to define function coefficients of an untrained model to convert the untrained model to the trained machine learning model, wherein the function coefficients are trained to identify the functional relationships between the training input data and the training output data to enable the trained machine learning model to predict the first loss valuation associated with the first type of loss event based at least in part upon the user data, and wherein the functional relationships comprise identified relationships between the one or more images of damaged property and monetary damages;

generate a loss event policy based at least in part on the first loss valuation;
receive event data associated with a particular event;
generate a specific event valuation based on the loss event policy and the event data;
receive third party event data associated with the particular event from a third party computer device, wherein the third party event data comprise at least one of a police report, an emergency services report, a fire services report, fire alarm data, water sensor data, a maintenance report, a home security system report, a smoke detector report, or a power meter report; and
adjust the specific event valuation to generate a revised event valuation based at least in part upon a specific loss valuation, the specific loss valuation being associated with the personal property affected by the particular event and determined based at least in part on the third party event data, wherein the trained machine learning model is further trained to update the function coefficients based on updated functional relationships between (i) inputs comprising the user data, the event data, and the third party event data, and (ii) an output comprising the revised event valuation.

2. The computer system of claim 1, wherein the one or more processors are further programmed to:
compare the particular event with the first type of loss event; and
generate the specific event valuation based at least in part on the first loss valuation associated with the first type of loss event.

3. The computer system of claim 2, wherein the one or more processors are further programmed to:
generate a recommended insurance payout based at least in part upon the revised event valuation; and
transmit the recommended insurance payout to an insurance provider computer device.

4. The computer system of claim 1, wherein the one or more processors are further programmed to:
utilize the trained machine learning model to determine a second loss valuation associated with a second type of loss event based at least in part upon the user data, wherein the first type of loss event and the second type of loss event are different types of loss events; and
generate the loss event policy based at least in part on the second loss valuation.

5. The computer system of claim 1, wherein the one or more processors are further programmed to:
receive inventory data associated with the particular event, wherein the inventory data include an inventory of the personal property affected by the particular event; and
analyze the inventory data in combination with at least one selected from a group consisting of the event data, the loss event policy, and the specific event valuation to generate an analysis,
wherein the revised event valuation is further based at least in part upon the analysis.

6. The computer system of claim 2, wherein the one or more processors are further programmed to:
determine the particular event matching a level of a plurality of levels for the first type of loss event; and
generate the specific event valuation based at least in part on the first loss valuation associated with the first type of loss event and the level.

7. The computer system of claim 2, wherein the one or more processors are further programmed to:
determine the particular event matching a sub-type of a plurality of sub-types of the first type of loss event; and
generate the specific event valuation based at least in part on the first loss valuation associated with the first type of loss event and the sub-type.

8. A computer-implemented method for determining personalized loss event valuations, the method implemented by a computer system including one or more processors, the computer-implemented method comprising:
receiving user data from a user computer device, wherein the user data include data related to personal information and personal property of a user, wherein the user data comprise a user income, a real-estate value associated with the user, and one or more first images of the personal property of the user;
utilizing a trained machine learning model to determine a first loss valuation associated with a first type of loss event based at least in part upon the user data, wherein the trained machine learning model comprises a convolutional neural network, wherein the trained machine learning model is trained, based on features comprising (i) training input data comprising user incomes, real-estate values, and one or more images of damaged property, and (ii) training output data comprising event loss values, using a supervised learning algorithm that identifies functional relationships and maps the training input data to the training output data, to define function coefficients of an untrained model to convert the untrained model to the trained machine learning model, wherein the function coefficients are trained to identify the functional relationships between the training input data and the training output data to enable the trained machine learning model to predict the first loss valuation associated with the first type of loss event based at least in part upon the user data, and wherein the functional relationships comprise identified relationships between the one or more images of damaged property and monetary damages;
generating a loss event policy based at least in part on the first loss valuation;
receiving event data associated with a particular event;
generating a specific event valuation based on the loss event policy and the event data;
receiving third party event data associated with the particular event from a third party computer device, wherein the third party event data comprise at least one of a police report, an emergency services report, a fire services report, fire alarm data, water sensor data, a maintenance report, a home security system report, a smoke detector report, or a power meter report; and
adjusting the specific event valuation to generate a revised event valuation based at least in part upon a specific loss valuation, the specific loss valuation being associated with the personal property affected by the particular event and determined based at least in part on the third party event data, wherein the trained machine learning model is further trained to update the function coefficients based on updated functional relationships between (i) inputs comprising the user data, the event data, and the third party event data, and (ii) an output comprising the revised event valuation.

9. The computer-implemented method of claim 8, further comprising:
comparing the particular event with the first type of loss event; and generating the specific event valuation based at least in part on the first loss valuation associated with the first type of loss event.

10. The computer-implemented method of claim 9, further comprising:
generating a recommended insurance payout based at least in part upon the revised event valuation; and
transmitting the recommended insurance payout to an insurance provider computer device.

11. The computer-implemented method of claim 8, further comprising:
utilizing the trained machine learning model to determine a second loss valuation associated with a second type of loss event based at least in part upon the user data, wherein the first type of loss event and the second type of loss event are different types of loss events; and
generating the loss event policy based at least in part on the second loss valuation.

12. The computer-implemented method of claim 8, further comprising:
receiving inventory data associated with the particular event, wherein the inventory data include an inventory of the personal property affected by the particular event; and
analyzing the inventory data in combination with at least one selected from a group consisting of the event data, the loss event policy, and the specific event valuation to generate an analysis,
wherein the revised event valuation is further based at least in part upon the analysis.

13. The computer-implemented method of claim 8, further comprising:
determining the particular event matching a level of a plurality of levels for the first type of loss event; and
generating the specific event valuation based at least in part on the first loss valuation associated with the first type of loss event and the level.

14. The computer-implemented method of claim 8, further comprising:
determining the particular event matching a sub-type of a plurality of sub-types of the first type of loss event; and
generating the specific event valuation based at least in part on the first loss valuation associated with the first type of loss event and the sub-type.

15. At least one non-transitory computer-readable storage media having computer-executable instructions embodied thereon for determining personalized loss event valuations, wherein, when executed by one or more processors, the computer-executable instructions cause the one or more processors to:
receive user data from a user computer device, wherein the user data include data related to personal information and personal property of a user, wherein the user data comprise a user income, a real-estate value associated with the user, and one or more first images of the personal property of the user;
utilize a trained machine learning model to determine a first loss valuation associated with a first type of loss event based at least in part on the user data, wherein the trained machine learning model comprises a convolutional neural network, wherein the trained machine learning model is trained, based on features comprising (i) training input data comprising user incomes, real-estate values, and one or more images of damaged property, and (ii) training output data comprising event loss values, using a supervised learning algorithm that identifies functional relationships and maps the training input data to the training output data, to define function coefficients of an untrained model to convert the untrained model to the trained machine learning model, wherein the function coefficients are trained to identify the functional relationships between the training input data and the training output data to enable the trained machine learning model to predict the first loss valuation associated with the first type of loss event based at least in part upon the user data, and wherein the functional relationships comprise identified relationships between the one or more images of damaged property and monetary damages;
generate a loss event policy based at least in part on the first loss valuation;
receive event data associated with a particular event;
generate a specific event valuation based on the loss event policy and the event data;
receive third party event data associated with the particular event from a third party computer device, wherein the third party event data comprise at least one of a police report, an emergency services report, a fire services report, fire alarm data, water sensor data, a maintenance report, a home security system report, a smoke detector report, or a power meter report; and
adjust the specific event valuation to generate a revised event valuation based at least in part upon a specific loss valuation, the specific loss valuation being associated with the personal property affected by the particular event and determined based at least in part on the third party event data, wherein the trained machine learning model is further trained to update the function coefficients based on updated functional relationships between (i) inputs comprising the user data, the event data, and the third party event data, and (ii) an output comprising the revised event valuation.

16. The non-transitory computer-readable storage media of claim 15, wherein the computer-executable instructions further cause the one or more processors to:
compare the event data with the first type of loss event; and
generate the specific event valuation based at least in part on the first loss valuation.

17. The non-transitory computer-readable storage media of claim 16, wherein the computer-executable instructions further cause the one or more processors to:
generate a recommended insurance payout based at least in part upon the revised event valuation; and
transmit the recommended insurance payout to an insurance provider computer device.

18. The non-transitory computer-readable storage media of claim 15, wherein the computer-executable instructions further cause the one or more processors to:
utilize the trained machine learning model to determine a second loss valuation associated with a second type of loss event based at least in part upon the user data, wherein the first type of loss event and the second type of loss event are different types of loss events; and
generate the loss event policy based at least in part on the second loss valuation.

19. The non-transitory computer-readable storage media of claim 15, wherein the computer-executable instructions further cause the one or more processors to:
receive inventory data associated with the particular event, wherein the inventory data include an inventory of the personal property affected by the particular event; and analyze the inventory data in combination with at least one selected from a group consisting of the event data, the loss event policy, and the specific event valuation to generate an analysis, wherein the revised event valuation is further based at least in part upon the analysis.

20. The non-transitory computer-readable storage media of claim 15, wherein the computer-executable instructions further cause the one or more processors to:

determine the particular event matching a level of a plurality of levels for the first type of loss event; and generate the specific event valuation based at least in part on the first loss valuation associated with the first type of loss event and the level.

* * * * *